US012642411B2

(12) United States Patent
Que

(10) Patent No.: US 12,642,411 B2
(45) Date of Patent: Jun. 2, 2026

(54) METHOD AND APPARATUS FOR CONTROLLING FLOOR CLEANING DEVICE, AND FLOOR CLEANING DEVICE

(71) Applicant: WUXI LITTLE SWAN ELECTRIC CO., LTD., Wuxi (CN)

(72) Inventor: Qiang Que, Wuxi (CN)

(73) Assignee: WUXI LITTLE SWAN ELECTRIC CO., LTD., Wuxi (CN)

( * ) Notice: Subject to any disclaimer, the term of this patent is extended or adjusted under 35 U.S.C. 154(b) by 32 days.

(21) Appl. No.: 18/294,914

(22) PCT Filed: Aug. 21, 2023

(86) PCT No.: PCT/CN2023/116351
§ 371 (c)(1),
(2) Date: Feb. 2, 2024

(87) PCT Pub. No.: WO2024/198232
PCT Pub. Date: Oct. 3, 2024

(65) Prior Publication Data
US 2025/0120557 A1      Apr. 17, 2025

(30) Foreign Application Priority Data
Mar. 29, 2023    (CN) .......................... 202310322897.9

(51) Int. Cl.
*A47L 11/40*          (2006.01)
*G05D 1/648*          (2024.01)
*G05D 105/10*          (2024.01)

(52) U.S. Cl.
CPC ....... *A47L 11/4011* (2013.01); *A47L 11/4036* (2013.01); *A47L 11/4083* (2013.01);
(Continued)

(58) Field of Classification Search
CPC .............. A47L 11/4011; A47L 11/4036; A47L 11/4083; A47L 11/4091; A47L 2201/00;
(Continued)

(56) References Cited

U.S. PATENT DOCUMENTS 9,265,396 B1      2/2016   Lu et al.
2019/0328197 A1      10/2019   Jung et al.
(Continued)

FOREIGN PATENT DOCUMENTS

CN      103961037 A      8/2014
CN      106510556      * 12/2016      ............ A47L 11/292
(Continued)

OTHER PUBLICATIONS

International Search Report dated Nov. 21, 2023 received in International Application No. PCT/CN2023/116351.
(Continued)

*Primary Examiner* — Brodie J Follman
(74) *Attorney, Agent, or Firm* — Scully, Scott, Murphy & Presser, P.C.

(57) ABSTRACT

A method and an apparatus for controlling a floor cleaning device, and a floor cleaning device are provided. The method includes: acquiring a floor cleaning instruction; and controlling the floor cleaning device move to a cleaning position, and supplying water to a cleaning component of the floor cleaning device in a process of movement of the floor cleaning device to the cleaning position. The preparation time for the floor cleaning device to be supplied with water and soaked in the base station may be reduced.

19 Claims, 4 Drawing Sheets

(52) U.S. Cl.
CPC .......... *A47L 11/4091* (2013.01); *G05D 1/648* (2024.01); *A47L 2201/00* (2013.01); *A47L 2201/026* (2013.01); *A47L 2201/04* (2013.01); *G05D 2105/10* (2024.01)

(58) Field of Classification Search
CPC .......... A47L 2201/026; A47L 2201/04; A47L 2201/02; A47L 11/03; A47L 2201/06; A47L 11/28; A47L 11/40; A47L 11/408; A47L 11/4088; G05D 1/648; G05D 2105/10; Y02B 40/00
See application file for complete search history.

(56) References Cited

U.S. PATENT DOCUMENTS

| | | | |
|---|---|---|---|
| 2021/0267429 A1 | 9/2021 | Lu et al. | |
| 2021/0330166 A1* | 10/2021 | Wu et al. | .............. A47L 11/283 |
| 2022/0047141 A1 | 2/2022 | Xu et al. | |
| 2025/0120557 A1 | 4/2025 | Que | |

FOREIGN PATENT DOCUMENTS

| | | | | |
|---|---|---|---|---|
| CN | 111345742 | * | 12/2019 | ............ A47L 11/282 |
| CN | 111436868 A | | 7/2020 | |
| CN | 112587045 A | | 4/2021 | |
| CN | 113455967 | * | 7/2021 | ............ A47L 11/282 |
| CN | 114073460 A | | 2/2022 | |
| CN | 114747989 A | | 7/2022 | |
| CN | 115590437 A | | 1/2023 | |
| CN | 115670315 A | | 2/2023 | |
| CN | 116509281 A | | 8/2023 | |
| EP | 3653098 A1 | | 5/2020 | |
| EP | 4085638 A1 | | 11/2022 | |
| KR | 20150006525 A | | 1/2015 | |
| RU | 2785769 C1 | | 12/2022 | |

OTHER PUBLICATIONS

Office Action dated Aug. 23, 2024 received in Russian Patent Application No. 2024104111/03.
Decision to Grant Patent dated Apr. 14, 2025 received in Russian Patent Application No. 2024104111/03.
Extended European search report dated Jun. 5, 2025 received in European Patent Application No. 23843971.5.
Office Action dated Mar. 25, 2026 received in Chinese Patent Application No. 202310322897.9.
Office Action dated Mar. 21, 2026 received in Singapore Patent Application No. 11202401242S.

* cited by examiner

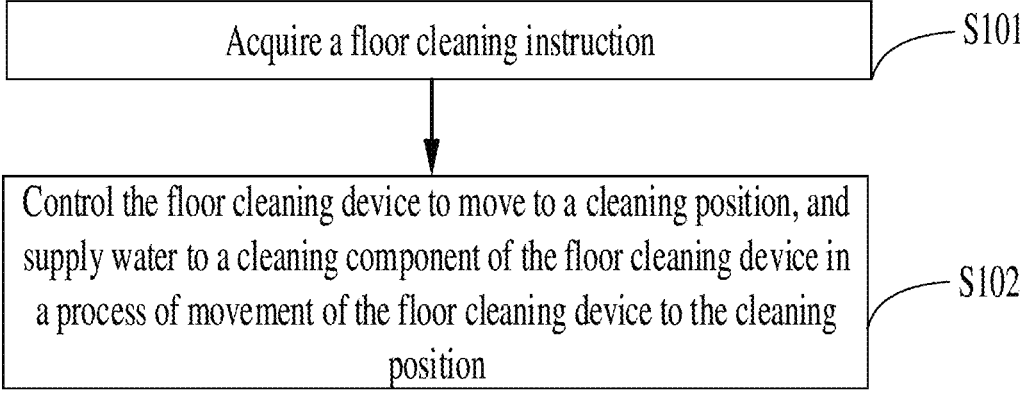
| Acquire a floor cleaning instruction | — S101 |
Control the floor cleaning device to move to a cleaning position, and supply water to a cleaning component of the floor cleaning device in a process of movement of the floor cleaning device to the cleaning position — S102
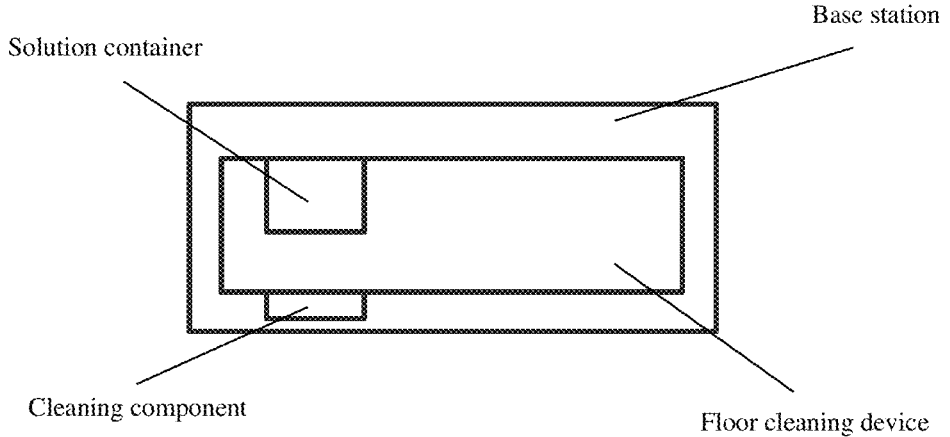
Base station
Solution container
Cleaning component
Floor cleaning device
FIG. 1

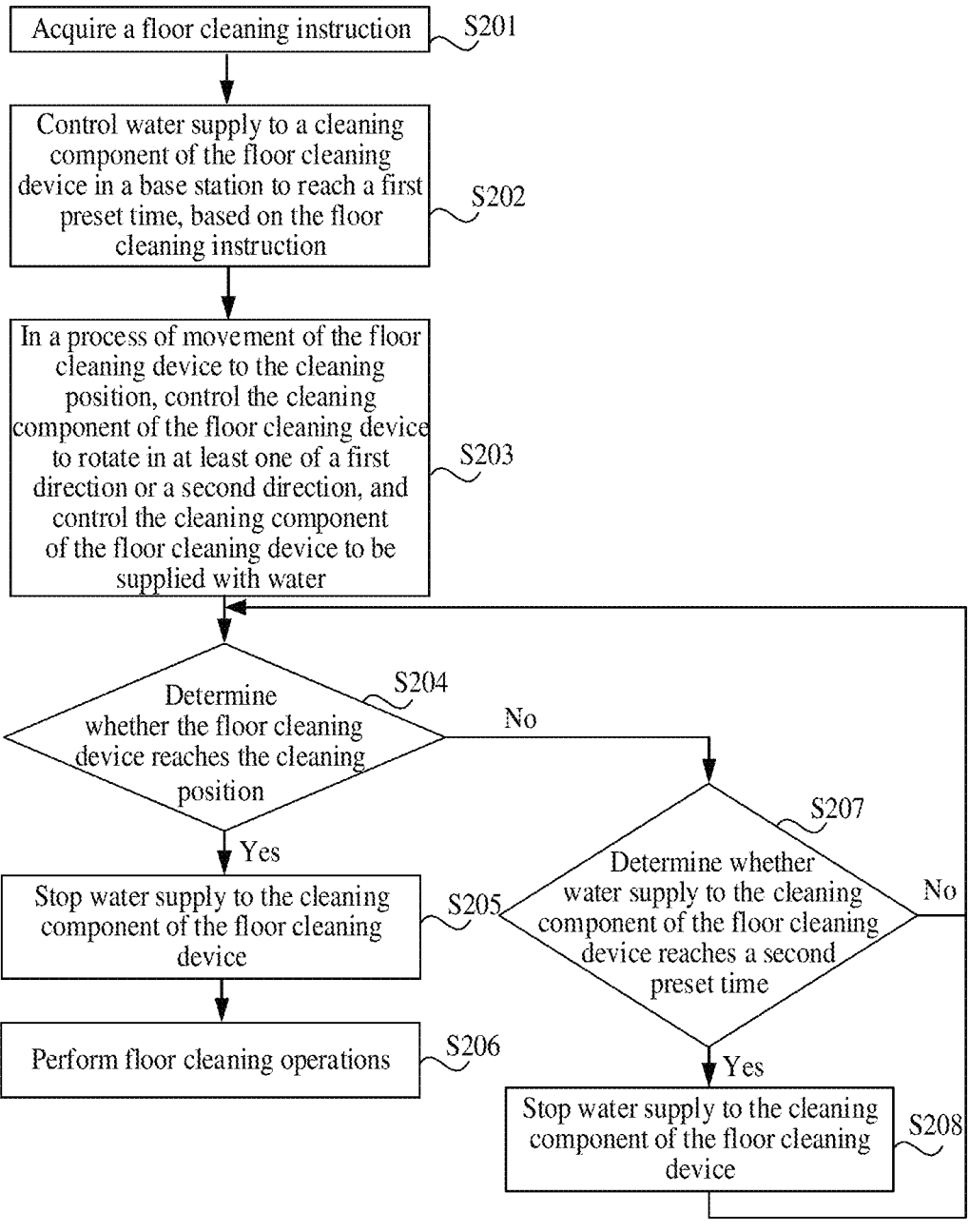

Acquire a floor cleaning instruction — S201

Control water supply to a cleaning component of the floor cleaning device in a base station to reach a first preset time, based on the floor cleaning instruction — S202

In a process of movement of the floor cleaning device to the cleaning position, control the cleaning component of the floor cleaning device to rotate in at least one of a first direction or a second direction, and control the cleaning component of the floor cleaning device to be supplied with water — S203

Determine whether the floor cleaning device reaches the cleaning position — S204

No

Yes

Stop water supply to the cleaning component of the floor cleaning device — S205

Perform floor cleaning operations — S206

Determine whether water supply to the cleaning component of the floor cleaning device reaches a second preset time — S207

No

Yes

Stop water supply to the cleaning component of the floor cleaning device — S208

METHOD AND APPARATUS FOR CONTROLLING FLOOR CLEANING DEVICE, AND FLOOR CLEANING DEVICE

CROSS-REFERENCE TO RELATED APPLICATIONS

This application is a National Stage Entry under 35 U.S.C. § 371 of PCT International Application No. PCT/CN2023/116351, filed on Aug. 31, 2023, which claims priority to Chinese Patent application No. 202310322897.9, filed at China National Intellectual Property Administration (CNIPA) on Mar. 29, 2023 and entitled "METHOD AND APPARATUS FOR CONTROLLING FLOOR CLEANING DEVICE, AND FLOOR CLEANING DEVICE", the entire contents of each of which are incorporated herein by reference.

FIELD

The disclosure relates to the field of floor cleaning devices, and in particular to a method and an apparatus for controlling a floor cleaning device, and a floor cleaning device.

BACKGROUND

With the advancement of science and technology and the development of economy, floor cleaning devices have gradually entered people's homes. Dust and debris accumulated on the floor may be cleaned by the floor cleaning device, freeing people's hands.

In the related art, the floor cleaning device needs to leave a base station and to move to a cleaning position when the floor cleaning device needs to perform floor cleaning operations. In order to ensure that a cleaning component of the floor cleaning device has a certain degree of wetness when cleaning the floor, it is necessary to wet the cleaning component for a long time before the floor cleaning device leaves the base station, and then the floor cleaning device moves to the cleaning position to perform the cleaning operations after the cleaning component is wet, which results in excessive preparation time for leaving the base station, and poor user experience.

SUMMARY

(I) Technical Problem to be Solved

The technical problem to be solved by the disclosure is to solve the following problem: the existing floor cleaning device needs to leave the base station and to move to the cleaning position when the floor cleaning device needs to perform the floor cleaning operations; in order to ensure that the cleaning component of the floor cleaning device has a certain degree of wetness when cleaning the floor, it is necessary to wet the cleaning component for a long time before the floor cleaning device leaves the base station, and then the floor cleaning device moves to the cleaning position to perform the cleaning operations after the cleaning component is wet, which results in excessive preparation time for leaving the base station, and poor user experience.

(II) Technical Solutions

In order to solve the above technical problem, the disclosure provides a method for controlling a floor cleaning device, an apparatus for controlling a floor cleaning device, and a floor cleaning device.

According to a first aspect, an embodiment of the disclosure provides a method for controlling a floor cleaning device, which includes the following operations.

A floor cleaning instruction is acquired.

The floor cleaning device is controlled to move to a cleaning position, and water is supplied to a cleaning component of the floor cleaning device in a process of movement of the floor cleaning device to the cleaning position.

In some embodiments, the method, before the floor cleaning device is controlled to move to the cleaning position and the water is supplied to the cleaning component of the floor cleaning device in the process of movement of the floor cleaning device to the cleaning position, further includes the following operation.

Water supply to the cleaning component of the floor cleaning device in a base station is controlled to reach a first preset time or a first preset volume, based on the floor cleaning instruction.

In some embodiments, the method, before the floor cleaning instruction is acquired, further includes the following operation.

A solution container of the floor cleaning device is controlled to be supplied with the water.

In some embodiments, the method, before the floor cleaning device is controlled to move to the cleaning position and the water is supplied to the cleaning component of the floor cleaning device in the process of movement of the floor cleaning device to the cleaning position, further includes the following operation.

It is determined that a current state of the floor cleaning device meets a condition for returning to a base station, the floor cleaning device is controlled to return to the base station, and a solution container of the floor cleaning device is controlled to be supplied with the water.

In some embodiments, the operation that the floor cleaning device is controlled to move to the cleaning position and the water is supplied to the cleaning component of the floor cleaning device in the process of movement of the floor cleaning device to the cleaning position includes the following operation.

In the process of movement of the floor cleaning device to the cleaning position, the cleaning component of the floor cleaning device is controlled to rotate in at least one of a first direction or a second direction, and the cleaning component of the floor cleaning device is controlled to be supplied with the water.

The first direction and the second direction are opposite rotation directions.

In some embodiments, the method further includes the following operation.

It is determined that water supply to the cleaning component of the floor cleaning device meets a preset condition, and the water supply to the cleaning component of the floor cleaning device is stopped.

In some embodiments, the operation that it is determined that the water supply to the cleaning component of the floor cleaning device meets the preset condition and the water supply to the cleaning component of the floor cleaning device is stopped includes the following operation.

It is determined that the floor cleaning device reaches the cleaning position, and the water supply to the cleaning component of the floor cleaning device is stopped.

In some embodiments, the operation that it is determined that the water supply to the cleaning component of the floor cleaning device meets the preset condition and the water supply to the cleaning component of the floor cleaning device is stopped includes the following operation.

It is determined that the water supply to the cleaning component of the floor cleaning device reaches a second preset time or a second preset volume, and the water supply to the cleaning component of the floor cleaning device is stopped.

In some embodiments, the method, when the water supply to the cleaning component of the floor cleaning device in the base station is controlled to reach the first preset time or the first preset volume, based on the floor cleaning instruction, further includes the following operation.

A solution container of the floor cleaning device is controlled to be supplied with the water.

According to a second aspect, an embodiment of the disclosure further provides an apparatus for controlling a floor cleaning device, which includes an instruction acquisition module and a control module.

The instruction acquisition module is configured to acquire a floor cleaning instruction.

The control module is configured to control the floor cleaning device to move to a cleaning position, and to supply water to a cleaning component of the floor cleaning device in a process of movement of the floor cleaning device to the cleaning position.

According to a third aspect, an embodiment of the disclosure further provides a computer-readable storage medium having stored thereon programs or instructions that when executed by a computer, perform operations of the method for controlling the floor cleaning device according to any one of the embodiments in the first aspect.

According to a fourth aspect, an embodiment of the disclosure further provides a floor cleaning device including a processor and a memory. The processor is configured to call programs or instructions stored in the memory to perform operations of the method for controlling the floor cleaning device according to any one of the embodiments in the first aspect.

(III) Advantageous Effects

Compared with the related art, the above technical solutions provided in the embodiments of the disclosure have advantages as follows.

In the method for controlling the floor cleaning device provided in the embodiments of the disclosure, the floor cleaning instruction is acquired; and the floor cleaning device is controlled to move to the cleaning position, and the water continues to be supplied to the cleaning component of the floor cleaning device in the process of movement of the floor cleaning device to the cleaning position. In the disclosure, after the floor cleaning instruction is acquired, the floor cleaning device is controlled to move to the cleaning position, and the water is supplied to the cleaning component of the floor cleaning device in the process of movement to the cleaning position, so as to improve the degree of wetness of the cleaning component of the floor cleaning device, thereby improving the cleaning effect of the floor cleaning device. Compared with the related art in which the cleaning component is soaked in the base station and then the floor cleaning device leaves the base station to perform cleaning, according to the method for controlling the floor cleaning device provided in the disclosure, the water is supplied to the cleaning component of the floor cleaning device in a process of controlling the floor cleaning device to move to the cleaning position. Therefore, the preparation time for the floor cleaning device to be supplied with water and soaked in the base station may be reduced, so that the floor cleaning device may quickly leave the base station after the floor cleaning instruction is acquired, thereby improving the efficiency of the floor cleaning device.

It should be understood that the above general description and the detailed description below are only exemplary and explanatory, and do not limit the disclosure.

BRIEF DESCRIPTION OF THE DRAWINGS

The accompanying drawings herein are incorporated in the description and constitute a part of the description, illustrate embodiments conforming to the disclosure, and are intended to explain the principles of the disclosure together with the description.

In order to explain the embodiments of the disclosure or technical solutions in the related art more clearly, the accompanying drawings required to be used in descriptions of the embodiments or the related art will be briefly introduced below. It is apparent that other drawings may also be obtained by those of ordinary skill in the art according to these accompanying drawings, without any creative effort.

FIG. 1 is a flowchart of a method for controlling a floor cleaning device according to an embodiment of the disclosure;

FIG. 2 is a flowchart of a method for controlling a floor cleaning device according to an embodiment of the disclosure;

DETAILED DESCRIPTION

Figure 3:
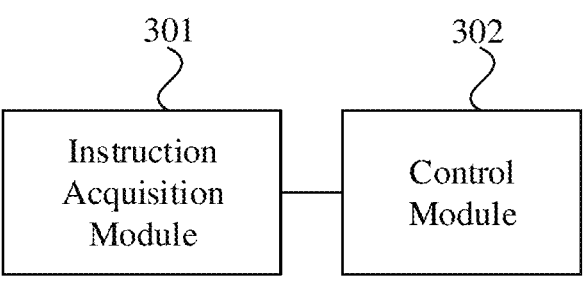
FIG. 3 is a schematic diagram of an apparatus for controlling a floor cleaning device according to an embodiment of the disclosure.

In order to make purposes, technical solutions and advantages of the embodiments of the disclosure clearer, the technical solutions in the embodiments of the disclosure will be clearing and completely described below. It is apparent that the described embodiments are only part of the embodiments of the disclosure, rather than all of the embodiments of the disclosure. Based on the embodiments of the disclosure, all other embodiments obtained by those of ordinary skill in the art without any creative effort shall fall within the protection scope of the disclosure.

In the related art, the floor cleaning device needs to leave a base station and to move to a cleaning position when the floor cleaning device needs to perform floor cleaning operations. In order to ensure that a cleaning component of the floor cleaning device has a certain degree of wetness when cleaning the floor, it is necessary to wet the cleaning component for a long time before the floor cleaning device leaves the base station, and then the floor cleaning device moves to the cleaning position to perform the cleaning operations after the cleaning component is wet, which results in excessive preparation time for leaving the base station, and poor user experience.

In order to solve the above problem, an embodiment of the disclosure provides a method for controlling a floor cleaning device. FIG. 1 is a flowchart of a method for controlling a floor cleaning device according to an embodiment of the disclosure. The method for controlling the floor cleaning device may be applied to application scenarios in which the floor needs to be cleaned. This method may be performed by an apparatus for controlling a floor cleaning device provided in an embodiment of the disclosure, and the apparatus for controlling the floor cleaning device may be implemented by software and/or hardware. FIG. 1 is a flowchart of a method for controlling a floor cleaning device according to an embodiment of the disclosure. As shown in FIG. 1, the method includes the following operations S101 and S102.

In S101, a floor cleaning instruction is acquired.

In an embodiment, the floor cleaning instruction may be for example sent by the floor cleaning device, or may be sent by a terminal device which is communicated and connected with the floor cleaning device. Sender of the floor cleaning instruction is not limited in the embodiments of the disclosure.

In S102, the floor cleaning device is controlled to move to a cleaning position, and water is supplied to a cleaning component of the floor cleaning device in a process of movement of the floor cleaning device to the cleaning position.

Since there is a certain distance between the base station of the floor cleaning device and the cleaning position, it is necessary to control the floor cleaning device to leave an accommodation chamber of the base station, and to move to the cleaning position. Since the dry cleaning component has a poor cleaning effect on the floor, the cleaning component of the floor cleaning device needs to keep in a wet state to clean the floor. Therefore, in the embodiment of the disclosure, in a process of controlling the floor cleaning device to move to the cleaning position, water is supplied to the cleaning component, so as to wet the cleaning component of the floor cleaning device, so that the degree of wetness of the cleaning component of the floor cleaning device is improved. Therefore, the preparation time for the floor cleaning device to be supplied with water and soaked in the base station may be shortened, so that the floor cleaning device may quickly leave the base station, thereby improving the efficiency of the floor cleaning device, and improving the cleaning effect of the floor cleaning device by using the soaked cleaning component.

In the embodiment of the disclosure, after the floor cleaning instruction is acquired, the floor cleaning device is controlled to move to the cleaning position, and the water is supplied to the cleaning component of the floor cleaning device in the process of movement to the cleaning position, so as to improve the degree of wetness of the cleaning component of the floor cleaning device, thereby improving the cleaning effect of the floor cleaning device. Compared with the related art in which the cleaning component is soaked in the base station and then the floor cleaning device leaves the base station to perform cleaning, according to the method for controlling the floor cleaning device provided in the embodiment of the disclosure, the water is supplied to the cleaning component of the floor cleaning device in the process of controlling the floor cleaning device to move to the cleaning position. Therefore, the preparation time for the floor cleaning device to be supplied with water and soaked in the base station may be reduced, so that the floor cleaning device may quickly leave the base station after the floor cleaning instruction is acquired, thereby improving the efficiency of the floor cleaning device.

In some embodiments, the method, before the floor cleaning device is controlled to move to the cleaning position and the water is supplied to the cleaning component of the floor cleaning device in the process of movement of the floor cleaning device to the cleaning position, further includes the following operation.

Water supply to the cleaning component of the floor cleaning device in a base station is controlled to reach a first preset time or a first preset volume, based on the floor cleaning instruction.

In an embodiment, the floor cleaning device returns to the base station after completing the previous floor cleaning operation. The accommodation chamber formed in the base station is configured to accommodate the floor cleaning device. The floor cleaning device may implement operations, such as charging, liquid supplement, cleaning of the cleaning component, in the accommodation chamber, and the floor cleaning device waits for the floor cleaning instruction corresponding to a next floor cleaning operation in the base station.

Since the dry cleaning component has a poor cleaning effect on the floor, the cleaning component of the floor cleaning device needs to have a certain degree of wetness, then the floor cleaning device moves out of the accommodation chamber of the base station and moves to the cleaning position to perform the floor cleaning operations. Therefore, in the embodiment of the disclosure, after the floor cleaning instruction is acquired, water supply to the cleaning component, such as a mop, of the floor cleaning device in the base station may be controlled to reach the first preset time, so as to wet the cleaning component of the floor cleaning device. Alternatively, after the floor cleaning instruction is acquired, water supply to the cleaning component of the floor cleaning device in the base station may be controlled to reach the first preset volume, so as to wet the cleaning component of the floor cleaning device to a certain extent. When the water supply reaches the first preset time or when the water supply reaches the first preset volume, water content of the cleaning component of the floor cleaning device allows for example the floor cleaning device to achieve a good cleaning effect. Therefore, the water supply in the base station reaches the first preset time or the first preset volume, so that the preparation time for the floor cleaning device to be supplied with water and soaked in the base station may be reduced. After the floor cleaning instruction is acquired, the floor cleaning device may quickly leave the base station, thereby improving the efficiency of the floor cleaning device. Furthermore, the wet cleaning component has better cleaning capability on the floor, thereby improving the cleaning effect of the floor cleaning device on the floor.

It should be noted that specific value of the first preset time or the first preset volume may be set according to the actual usage of the floor cleaning device, which is not limited in the embodiments of the disclosure.

In some embodiments, the method, before the floor cleaning instruction is acquired, further includes the following operation.

A solution container of the floor cleaning device is controlled to be supplied with the water.

In an embodiment, since the water in the solution container of the floor cleaning device needs to be consumed when the water is supplied to the cleaning component of the floor cleaning device, the solution container of the floor cleaning device may be firstly controlled to be supplied with the water before the floor cleaning instruction is acquired, so that the water volume in the solution container of the floor cleaning device meets the water volume required for wetting the cleaning component in the process of movement of the floor cleaning device to the cleaning position. By supplying water to the solution container of the floor cleaning device, it is possible to avoid the following problem: when the water is supplied to the cleaning component in the process of movement of the floor cleaning device to the cleaning position, the degree of wetness of the cleaning component is insufficient due to insufficient water volume in the solution container of the floor cleaning device, thereby affecting the cleaning effect of the floor cleaning device. After the floor cleaning instruction is acquired, the floor cleaning device may directly move to the cleaning position without waiting for completion of water supply to the solution container of the floor cleaning device, so that the waiting time of the floor cleaning device is shortened, thereby improving the efficiency of the floor cleaning device.

In some embodiments, the method, before the floor cleaning device is controlled to move to the cleaning position and the water is supplied to the cleaning component of the floor cleaning device in the process of movement of the floor cleaning device to the cleaning position, further includes the following operation.

It is determined that a current state of the floor cleaning device meets a condition for returning to a base station, the floor cleaning device is controlled to return to the base station, and a solution container of the floor cleaning device is controlled to be supplied with the water.

Exemplarily, when the floor cleaning device performs the floor cleaning operations, the water content of the cleaning component of the floor cleaning device may gradually decrease as the floor cleaning operations progress, and when the water volume in the solution container of the floor cleaning device is insufficient to continue soaking the cleaning component, the floor cleaning device may be controlled to return to the base station, and the solution container of the floor cleaning device may be controlled to be supplied with the water, so that the water in the solution container of the floor cleaning device may continue to soak the cleaning component in subsequent floor cleaning operations.

In some embodiments, the operation that the floor cleaning device is controlled to move to the cleaning position, and the water is supplied to the cleaning component of the floor cleaning device in the process of movement of the floor cleaning device to the cleaning position includes the following operation.

In the process of movement of the floor cleaning device to the cleaning position, the cleaning component of the floor cleaning device is controlled to rotate in at least one of a first direction or a second direction, and the cleaning component of the floor cleaning device is controlled to be supplied with the water.

The first direction and the second direction are opposite rotation directions.

In an embodiment, when the water supply to the cleaning component of the floor cleaning device reaches the first preset time before the floor cleaning device leaves the base station, degree of soaking of the cleaning component of the floor cleaning device is limited. Therefore, when the floor cleaning device leaves the base station and moves to the cleaning position, it is necessary to continue to supply water to the cleaning component, so as to improve the degree of wetness of the cleaning component of the floor cleaning device. In the process of movement of the floor cleaning device to the cleaning position, the cleaning component of the floor cleaning device does not direct contact with the floor and does not perform the floor cleaning operations, but is in a hovering state with a certain distance from the floor. In this case, the cleaning component of the floor cleaning device may rotate in the first direction and/or the second direction. The first direction may be for example a clockwise direction, and the second direction may be for example a counter-clockwise direction. Further, the solution container of the floor cleaning device continues to supply water to the cleaning component of the floor cleaning device. With the rotation of the cleaning component in the first direction and/or the second direction, the water may fully and uniformly soak the cleaning component, so as to avoid the problem that the water is concentrated in a single position of the cleaning component of the floor cleaning device while other positions have a poor degree of soaking, thereby improving soaking uniformity of the cleaning component.

In some embodiments, the method for controlling the floor cleaning device further includes the following operation.

It is determined that water supply to the cleaning component of the floor cleaning device meets a preset condition, and the water supply to the cleaning component of the floor cleaning device is stopped.

In an embodiment, since the cleaning component of the floor cleaning device has a certain saturated water absorption volume, when the water supplied to the cleaning component of the floor cleaning device exceeds a certain volume, the cleaning component of the floor cleaning device cannot continue to absorb the water to increase its degree of wetness. Therefore, when the cleaning component of the floor cleaning device meets the preset condition, the water is not supplied to the cleaning component of the floor cleaning device any more. Thus, water waste is avoided and energy consumption is saved, while achieving soaking of the cleaning component of the floor cleaning device.

In some embodiments, the operation that it is determined that the water supply to the cleaning component of the floor cleaning device meets the preset condition, and the water supply to the cleaning component of the floor cleaning device is stopped includes the following operation.

It is determined that the floor cleaning device reaches the cleaning position, and the water supply to the cleaning component of the floor cleaning device is stopped.

In an embodiment, when the floor cleaning device reaches the cleaning position, the solution container of the floor cleaning device does not supply water to the cleaning component of the floor cleaning device any more, and the cleaning component of the floor cleaning device is controlled to descend and come into contact with the floor, so as to start performing the floor cleaning operations.

In some embodiments, the operation that it is determined that the water supply to the cleaning component of the floor cleaning device meets the preset condition and the water supply to the cleaning component of the floor cleaning device is stopped includes the following operation.

It is determined that the water supply to the cleaning component of the floor cleaning device reaches a second preset time or a second preset volume, and the water supply to the cleaning component of the floor cleaning device is stopped.

In an embodiment, in the process of movement of the floor cleaning device to the cleaning position, the water supply to the cleaning component is controlled to reach the second preset time or the second preset volume. Exemplarily, when the water supply reaches the second preset time or the second preset volume, the water content of the cleaning component of the floor cleaning device may for example allow the floor cleaning device to achieve a good cleaning effect. Further water supply to the cleaning component of the floor cleaning device cannot continue to improve the cleaning capability of the floor cleaning device. Even if the floor cleaning device does not reach the cleaning position, the cleaning component of the floor cleaning device is controlled not to be supplied with water any more. In this way, it is possible to avoid water waste due to continuous water supply to the cleaning component of the floor cleaning device, and energy consumption is saved while achieving soaking of the cleaning component of the floor cleaning device.

In some embodiments, the method, when the water supply to the cleaning component of the floor cleaning device in the base station is controlled to reach the first preset time or the first preset volume, based on the floor cleaning instruction, further includes the following operation.

A solution container of the floor cleaning device is controlled to be supplied with the water.

In an embodiment, after the floor cleaning instruction is acquired, in a process that the water supply to the cleaning component of the floor cleaning device reaches the first preset time or the first preset volume, since the solution container of the floor cleaning device continues to supplement water to the cleaning component of the floor cleaning device, the water volume in the solution container of the floor cleaning device continuously decreases. In order to ensure that a certain volume of water is stored in the solution container of the floor cleaning device, the solution container of the floor cleaning device may be controlled to be supplied with water, so that there is enough water in the solution container of the floor cleaning device to supplement water to the cleaning component of the floor cleaning device, so as to avoid the problem of excessive waiting time for water supply to the floor cleaning device since the water is supplemented to the solution container of the floor cleaning device after the water in the solution container of the floor cleaning device is completely exhausted, thereby improving the cleaning efficiency of the floor cleaning device. It also ensures that after the floor cleaning device leaves the base station, there is enough water in the solution container of the floor cleaning device to continue supplying water to the cleaning component of the floor cleaning device.

FIG. 2 is a flowchart of a method for controlling a floor cleaning device according to an embodiment of the disclosure. As shown in FIG. 2, the method for controlling the floor cleaning device includes the following operations S201 to S208.

In S201, a floor cleaning instruction is acquired.

In S202, water supply to a cleaning component of the floor cleaning device in a base station is controlled to reach a first preset time, based on the floor cleaning instruction.

In S203, in a process of movement of the floor cleaning device to the cleaning position, the cleaning component of the floor cleaning device is controlled to rotate in at least one of a first direction or a second direction, and the cleaning component of the floor cleaning device is controlled to be supplied with water.

In S204, it is determined whether the floor cleaning device reaches the cleaning position. If yes, S205 is performed; if no, S207 is performed.

In S205, water supply to the cleaning component of the floor cleaning device is stopped.

In S206, floor cleaning operations are performed.

In S207, it is determined whether water supply to the cleaning component of the floor cleaning device reaches a second preset time. If yes, S208 is performed; if no, S204 is performed.

In S208, water supply to the cleaning component of the floor cleaning device is stopped.

In the embodiment of the disclosure, after the floor cleaning instruction is acquired, the floor cleaning device is controlled to move to the cleaning position, and the water is supplied to the cleaning component of the floor cleaning device in the process of movement to the cleaning position, so as to improve the degree of wetness of the cleaning component of the floor cleaning device, thereby improving the cleaning effect of the floor cleaning device. Compared with the related art in which the cleaning component is soaked in the base station and then the floor cleaning device leaves the base station to perform cleaning, according to the method for controlling the floor cleaning device provided in the embodiment of the disclosure, the water is supplied to the cleaning component of the floor cleaning device in a process of controlling the floor cleaning device to move to the cleaning position. Therefore, the preparation time for the floor cleaning device to be supplied with water and soaked in the base station may be reduced, so that the floor cleaning device may quickly leave the base station after the floor cleaning instruction is acquired, thereby improving the efficiency of the floor cleaning device.

An embodiment of the disclosure further provides an apparatus for controlling a floor cleaning device. FIG. 3 is a schematic diagram of an apparatus for controlling a floor cleaning device according to an embodiment of the disclosure. As shown in FIG. 3, the apparatus for controlling the floor cleaning device includes an instruction acquisition module 301 and a control module 302. The instruction acquisition module 301 is configured to acquire a floor cleaning instruction. The control module 302 is configured to control the floor cleaning device to move to a cleaning position, and to supply water to a cleaning component of the floor cleaning device in a process of movement of the floor cleaning device to the cleaning position.

The apparatus provided in the above embodiment of the disclosure is based on the same inventive concept and has the same advantageous effect as the method provided in the embodiments of the disclosure, which are not elaborated here.

An embodiment of the disclosure further provides a computer-readable storage medium having stored thereon programs or instructions that when executed by a computer, perform operations of any one of the methods provided in the above embodiments.

In some embodiments, when computer-executable instructions are executed by a processor of the computer, the computer-executable instructions may also be configured to perform the technical solution of any one of the above methods provided in the embodiments of the disclosure, so as to achieve corresponding advantageous effects.

According to the descriptions of the above embodiments, it may be clearly understood by those skilled in the art that the disclosure may be implemented by means of software and a necessary general-purpose hardware, of course, the disclosure may also be implemented by hardware, however, the former is a better implementation in many cases. Based on such an understanding, the technical solutions of the disclosure essentially or the part contributing to the related art may be implemented in a form of a software product. The computer software product may be stored in a computer-readable storage medium, such as a floppy disk of the computer, a Read-Only Memory (ROM), a Random Access Memory (RAM), a flash memory (FLASH), a hard disk, or an optical disk, and includes several instructions for instructing a computer device (which may be a personal computer, a server, or a network device) to perform the methods of various embodiments of the disclosure.

Figure 4:
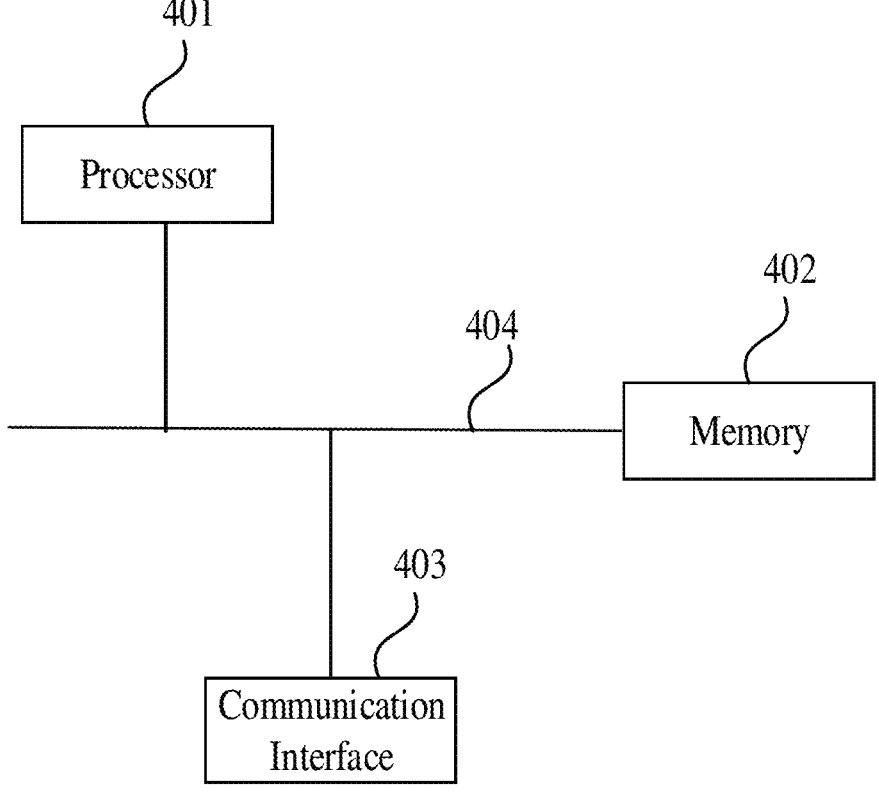
FIG. 4 is a schematic diagram of a floor cleaning device according to an embodiment of the disclosure.

FIG. 4 is a schematic diagram of a floor cleaning device according to an embodiment of the disclosure. As shown in FIG. 4, the floor cleaning device includes a processor 401 and a memory 402. The processor 401 is configured to call programs or instructions stored in the memory 402 to perform operations of the methods of the above embodiments, and thus has the advantageous effects of the above embodiments, which are not elaborated here.

As shown in FIG. 4, it may be provided that the floor cleaning device includes at least one processor 401, at least one memory 402, and at least one communication interface 403. Various components in the floor cleaning device are coupled together through a bus system 404. The communication interface 403 is configured for information transmission between the floor cleaning device and external devices. It may be understood that the bus system 404 is configured to implement connection and communication between these components. The bus system 404 includes a power bus, a control bus and a status signal bus, in addition to a data bus. However, for the sake of clarity, in FIG. 4, various buses are marked as the bus system 404.

It may be understood that the memory 402 in the embodiment may be a volatile memory or a non-volatile memory, or may include both volatile and non-volatile memories. In some implementations, the memory 402 stores elements as follows: executable units or data structures, or a subset thereof, or an extension set thereof, an operating system, and applications. In the embodiment of the disclosure, the processor 401 is configured to call programs or instructions stored in the memory 402 to perform operations of the methods provided in the embodiments of the disclosure.

The methods provided in the embodiments of the disclosure may be applied to the processor 401 or implemented by the processor 401. The processor 401 may be an integrated circuit chip with signal processing capability. During implementation, each of operations of the above methods may be completed by an integrated logic circuit in form of hardware in the processor 401 or instructions in form of software. The above processor 401 may be a general-purpose processor, a Digital Signal Processor (DSP), an Application Specific Integrated Circuit (ASIC), a Field Programmable Gate Array (FPGA), or other programmable logic devices, discrete gates or transistor logic devices, or discrete hardware components. The general-purpose processor may be a microprocessor, or any conventional processor, etc.

The Operation of the methods provided in the embodiments of the disclosure may be directly embodied as being performed and completed by a hardware decoding processor, or performed and completed by a combination of hardware and software units in the decoding processor. The software units may be located in a mature storage medium in the field, such as a RAM, a flash memory, a ROM, a Programmable ROM (PROM), or an electrically erasable programmable memory, a register, etc. The storage medium is located in the memory 402. The processor 401 reads information in the memory 402 and completes the operations of the methods in combination with hardware thereof.

The floor cleaning device may further include one physical component, or multiple physical components, depending on instructions generated by the processor 401 when executing the methods provided in the embodiments of the disclosure. Different physical components may be arranged inside or outside the floor cleaning device, such as a cloud server. Each physical component cooperates with the processor 401 and the memory 402 to implement functions of the floor cleaning device in this embodiment.

It should be noted that relational terms herein such as "first", "second" or the like are only intended to distinguish an entity or operation from another entity or operation, and do not necessarily require or imply that any such actual relationship or sequence is present between these entities or operations. Furthermore, terms "include", "contain" or any other variants thereof are intended to cover a non-exclusive inclusion, so that a process, a method, an article or a device that includes a series of elements includes not only those elements, but also other elements which are not clearly listed, or further includes elements inherent to such a process, method, article or device. Without further limitation, an element defined by a sentence "includes a . . . " does not exclude the presence of additional identical elements in the process, method, article or device that includes the element.

The above descriptions are only specific implementations of the disclosure, to enable those skilled in the art to understand or implement the disclosure. Various modifications to these embodiments will be apparent to those skilled in the art, and general principles defined here may be implemented in other embodiments without departing from the spirit or scope of the disclosure. Therefore, the disclosure will not be limited to these embodiments described here, instead, should conform to the widest scope consistent with principles and novel characteristics disclosed here.

INDUSTRIAL APPLICABILITY

According to the method for controlling the floor cleaning device provided in the disclosure, a floor cleaning instruction is acquired; and the floor cleaning device is controlled to move to the cleaning position, and the water continues to be supplied to the cleaning component of the floor cleaning device in the process of movement of the floor cleaning device to the cleaning position. In the disclosure, after the floor cleaning instruction is acquired, the floor cleaning device is controlled to move to the cleaning position, and the water is supplied to the cleaning component of the floor cleaning device in the process of movement to the cleaning position, so as to improve the degree of wetness of the cleaning component of the floor cleaning device, thereby improving the cleaning effect of the floor cleaning device. Compared with the related art in which the cleaning component is soaked in the base station and then the floor cleaning device leaves the base station to perform cleaning, according to the method for controlling the floor cleaning device provided in the disclosure, the water is supplied to the cleaning component of the floor cleaning device in a process of controlling the floor cleaning device to move to the cleaning position. Therefore, the preparation time for the floor cleaning device to be supplied with water and soaked in the base station may be reduced, so that the floor cleaning device may quickly leave the base station after the floor cleaning instruction is acquired, thereby improving the efficiency of the floor cleaning device, which has strong industrial applicability.

The invention claimed is:

1. An apparatus for controlling a floor cleaning device, comprising:
   one or more processors configured to:
   acquire a floor cleaning instruction;
   control the floor cleaning device to move from a base station to a cleaning position; and
   control the floor cleaning device to supply water, from a solution container provided on board the floor cleaning device, to a cleaning component of the floor cleaning device while the floor cleaning device is moving from the base station to the cleaning position.

2. The apparatus according to claim 1, wherein the one or more processors are further configured to, before controlling the floor cleaning device to move from the base station to the cleaning position and controlling the floor cleaning device to supply the water to the cleaning component while the floor cleaning device is moving from the base station to the cleaning position:

while the floor cleaning device is at the base station, control water to be supplied to the cleaning component of the floor cleaning device for a base station preset time or control a base station preset volume of water to be supplied to the cleaning component of the floor cleaning device, based on the floor cleaning instruction.

3. The apparatus according to claim 1, wherein the one or more processors are further configured to, before acquiring the floor cleaning instruction, control the solution container of the floor cleaning device to be supplied with the water.

4. The apparatus according to claim 1, wherein the one or more processors are further configured to, before controlling the floor cleaning device to move from the base station to the cleaning position and controlling the floor cleaning device to supply the water to the cleaning component while the floor cleaning device is moving from the base station to the cleaning position:

determine that a current state of the floor cleaning device meets a condition for returning to a base station;

control the floor cleaning device to return to the base station; and control the solution container of the floor cleaning device to be supplied with the water.

5. The apparatus according to claim 1, wherein the one or more processors are further configured to, while the floor cleaning device is moving from the base station to the cleaning position:

control the cleaning component of the floor cleaning device to rotate in at least one of a first direction or a second direction; and control the floor cleaning device to supply water to the cleaning component of the floor cleaning device while the cleaning component is being rotated in the at least one of the first direction or the second direction, wherein the first direction and the second direction are opposite rotation directions.

6. The apparatus according to claim 1, wherein the one or more processors are further configured to, while the floor cleaning device is moving from the base station to the cleaning position:

determine that water supply to the cleaning component of the floor cleaning device meets a preset condition; and stop the water supply to the cleaning component of the floor cleaning device.

7. The apparatus according to claim 6, wherein the one or more processors are configured to determine that the preset condition is met in response to determining that the floor cleaning device has reached the cleaning position.

8. The apparatus according to claim 6, wherein the one or more processors are configured to determine that the preset condition is met in response to determining that the water has been supplied to the cleaning component of the floor cleaning device for a moving preset time or in response to determining that a moving preset volume of water has been supplied to the cleaning component of the floor cleaning device.

9. The apparatus according to claim 2, wherein, while controlling the water to be supplied to the cleaning component of the floor cleaning device for the base station preset time or controlling the base station preset volume of water to be supplied to the cleaning component of the floor cleaning device, based on the floor cleaning instruction, the one or more processors are further configured to control the solution container of the floor cleaning device to be supplied with the water.

10. A floor cleaning device comprising:

one or more processors; and a memory stored thereon programs or instructions, wherein one or more processors are configured to execute the programs or instructions to:

acquire a floor cleaning instruction;

control the floor cleaning device to move from a base station to a cleaning position; and control the floor cleaning device to supply water, from a solution container provided on board the floor cleaning device, to a cleaning component of the floor cleaning device while the floor cleaning device is moving from the base station to the cleaning position.

11. The floor cleaning device according to claim 10, wherein the one or more processors are further configured to, before controlling the floor cleaning device to move from the base station to the cleaning position and controlling the floor cleaning device to supply the water to the cleaning component while the floor cleaning device is moving from the base station to the cleaning position:

while the floor cleaning device is at the base station, control water to be supplied to the cleaning component of the floor cleaning device for a base station preset time or control a base station preset volume of water to be supplied to the cleaning component of the floor cleaning device, based on the floor cleaning instruction.

12. The floor cleaning device according to claim 10, wherein the one or more processors are further configured to, before acquiring the floor cleaning instruction, control the solution container of the floor cleaning device to be supplied with the water.

13. The floor cleaning device according to claim 10, wherein the one or more processors are further configured to, before controlling the floor cleaning device to move from the base station to the cleaning position and controlling the floor cleaning device to supply the water to the cleaning component while the floor cleaning device is moving from the base station to the cleaning position:

determine that a current state of the floor cleaning device meets a condition for returning to a base station;

control the floor cleaning device to return to the base station; and control the solution container of the floor cleaning device to be supplied with the water.

14. The floor cleaning device according to claim 10, wherein the one or more processors are further configured to, while the floor cleaning device is moving from the base station to the cleaning position:

control the cleaning component of the floor cleaning device to rotate in at least one of a first direction or a second direction; and control the floor cleaning device to supply water to the cleaning component of the floor cleaning device while the cleaning component is being rotated in the at least one of the first direction or the second direction, wherein the first direction and the second direction are opposite rotation directions.

15. The floor cleaning device according to claim 10, wherein the one or more processors are further configured to, while the floor cleaning device is moving from the base station to the cleaning position:

determine that water supply to the cleaning component of the floor cleaning device meets a preset condition; and stop the water supply to the cleaning component of the floor cleaning device.

16. The floor cleaning device according to claim 15, wherein the one or more processors are configured to determine that the preset condition is met in response to determining that the floor cleaning device has reached the cleaning position.

17. The floor cleaning device according to claim 15, wherein the one or more processors are configured to determine that the preset condition is met in response to determining that the water has been supplied to the cleaning component of the floor cleaning device for a moving preset time or in response to determining that a moving preset volume of water has been supplied to the cleaning component of the floor cleaning device.

18. The floor cleaning device according to claim 11, wherein, while controlling the water to be supplied to the cleaning component of the floor cleaning device for the first the base station preset time or controlling the base station preset volume of water to be supplied to the cleaning component of the floor cleaning device, based on the floor cleaning instruction, the one or more processors are further configured to control the solution container of the floor cleaning device to be supplied with the water.

19. A non-transitory computer-readable storage medium having stored thereon programs or instructions that when executed by one or more processors, cause the one or more processors to perform a method for controlling a floor cleaning device, the method comprising:

acquiring a floor cleaning instruction;

controlling the floor cleaning device to move from a base station to a cleaning position; and controlling the floor cleaning device to supply water, from a solution container provided on board the floor cleaning device, to a cleaning component of the floor cleaning device while the floor cleaning device is moving from the base station to the cleaning position.

* * * * *